Feb. 28, 1967
M. J. CADY ETAL
3,305,935
VEHICLE TEST SYSTEM
Filed Sept. 29, 1964
5 Sheets-Sheet 5
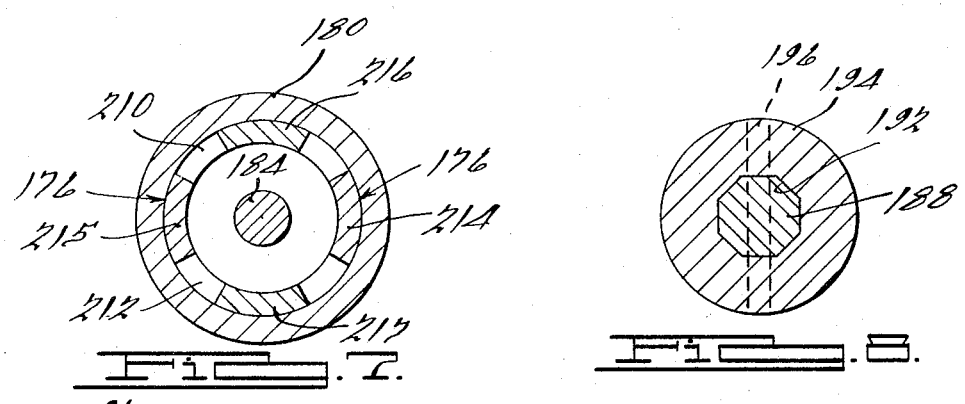
FIG. 7.
FIG. 8.
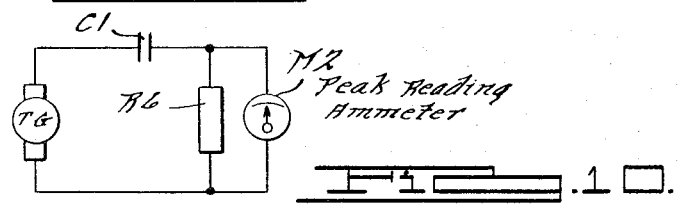
FIG. 10.
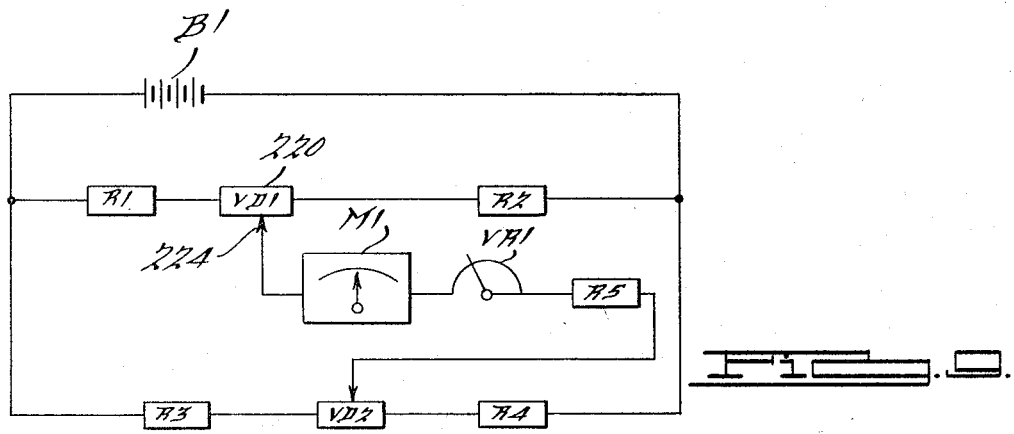
FIG. 9.
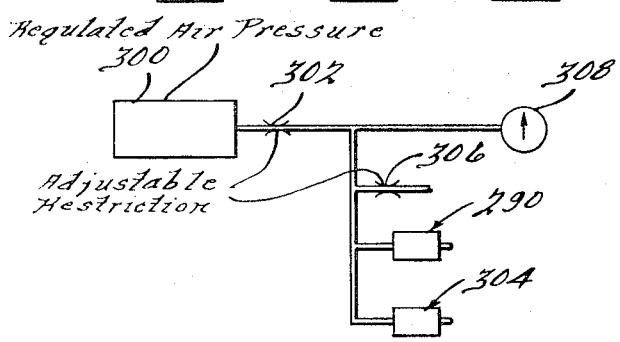
FIG. 11.
INVENTORS.
Mark J. Cady,
Dag J. Eidnes.
BY
Carness, Dickey & Pierce
ATTORNEYS

United States Patent Office 3,305,935
Patented Feb. 28, 1967

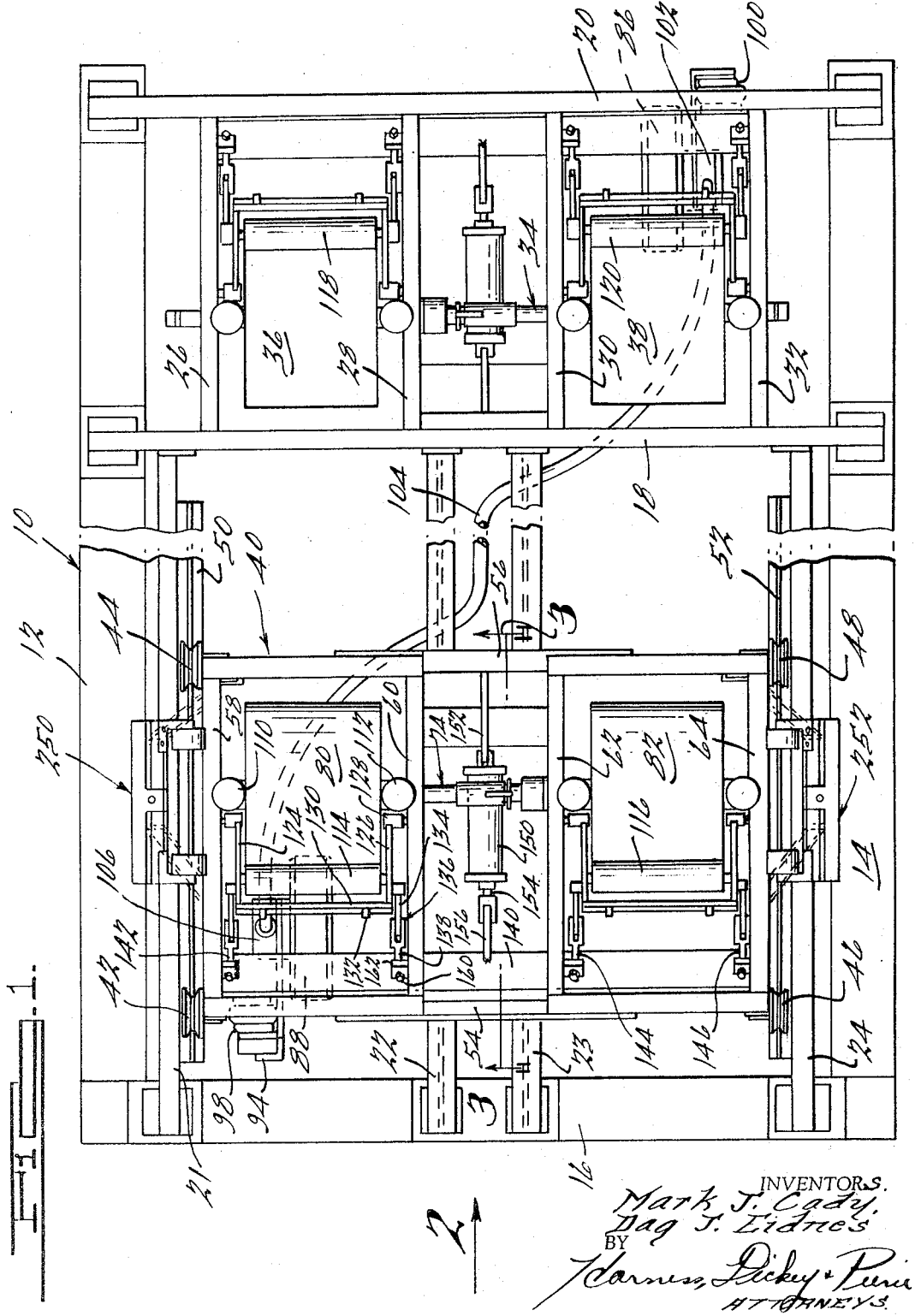

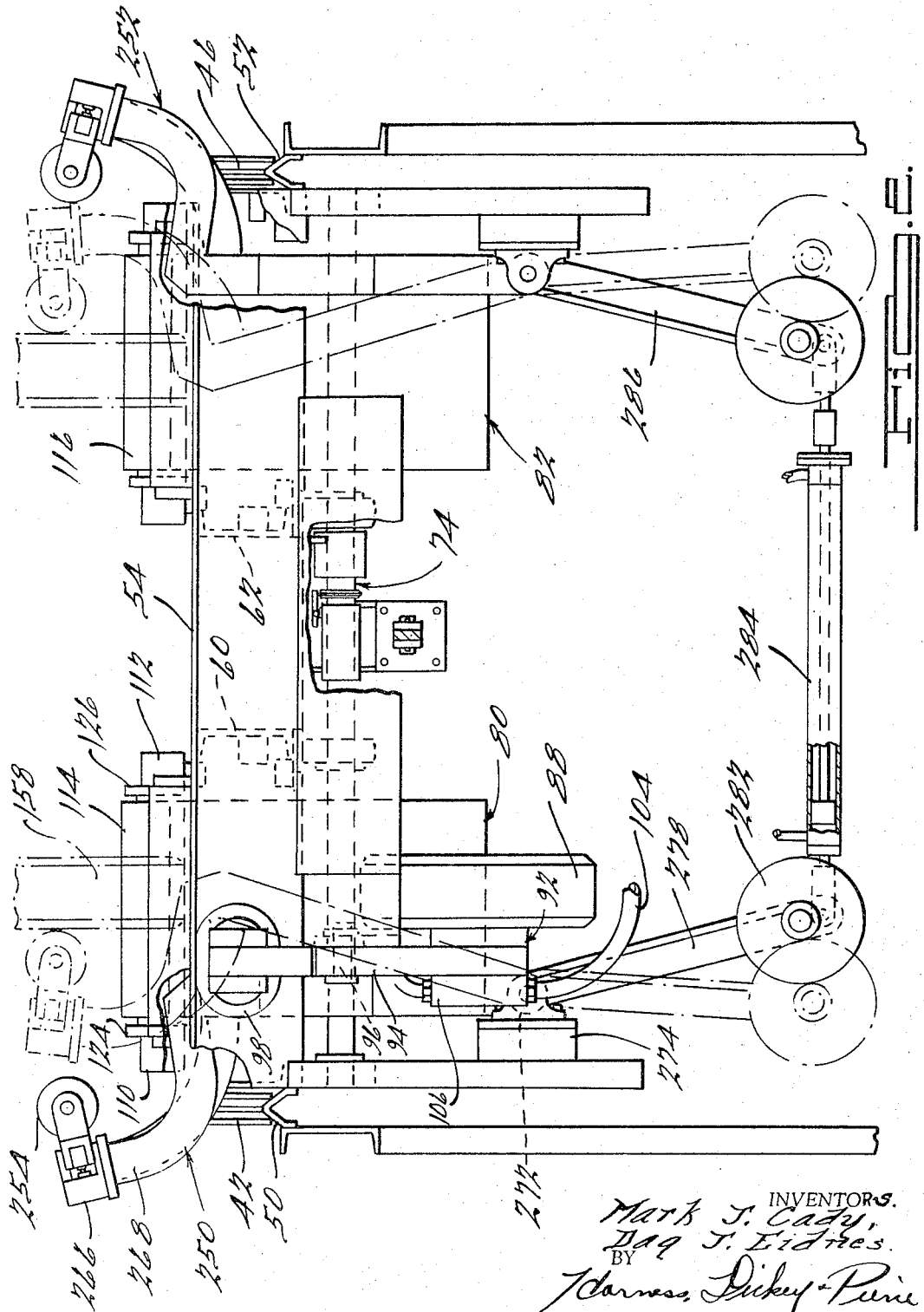

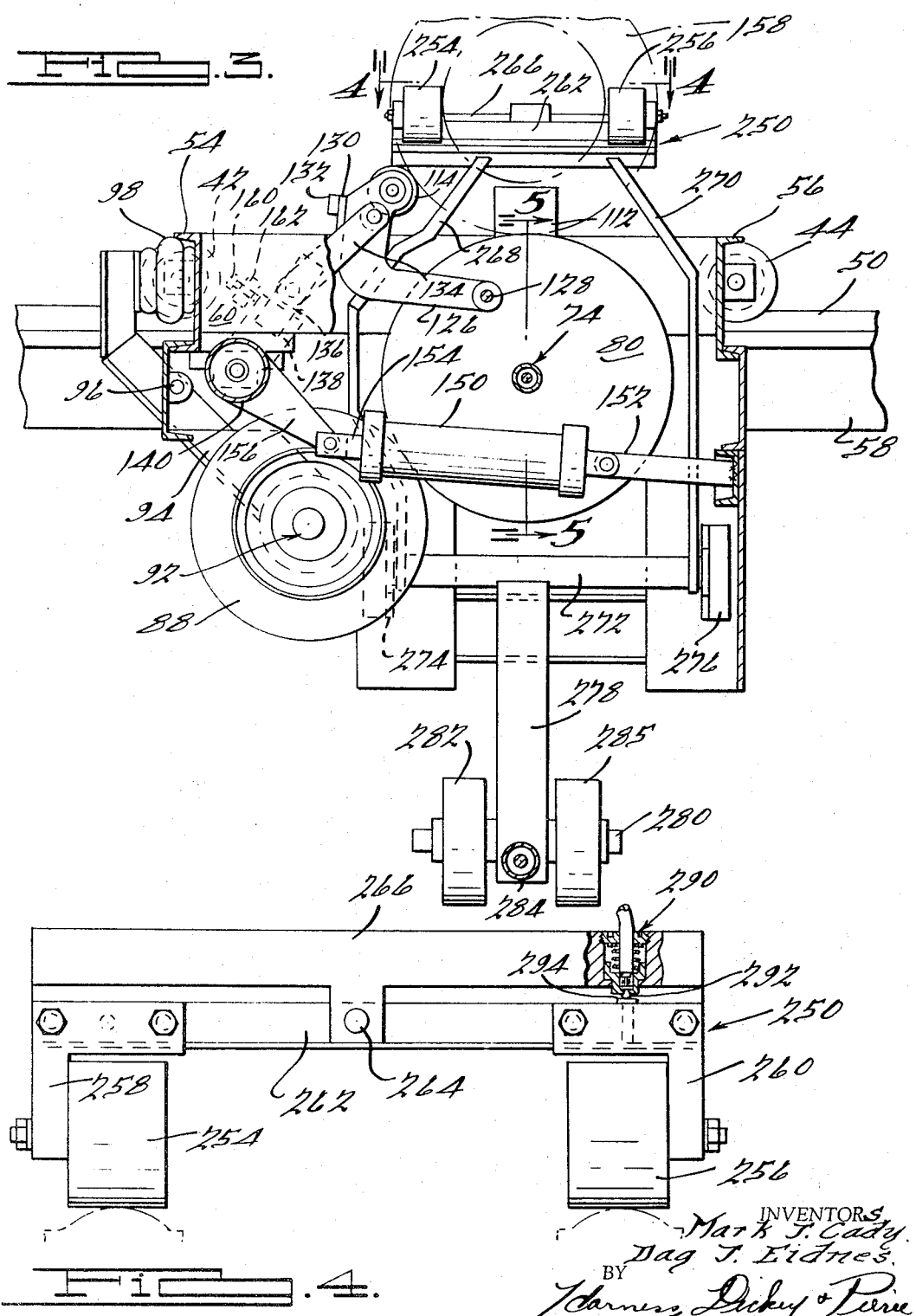

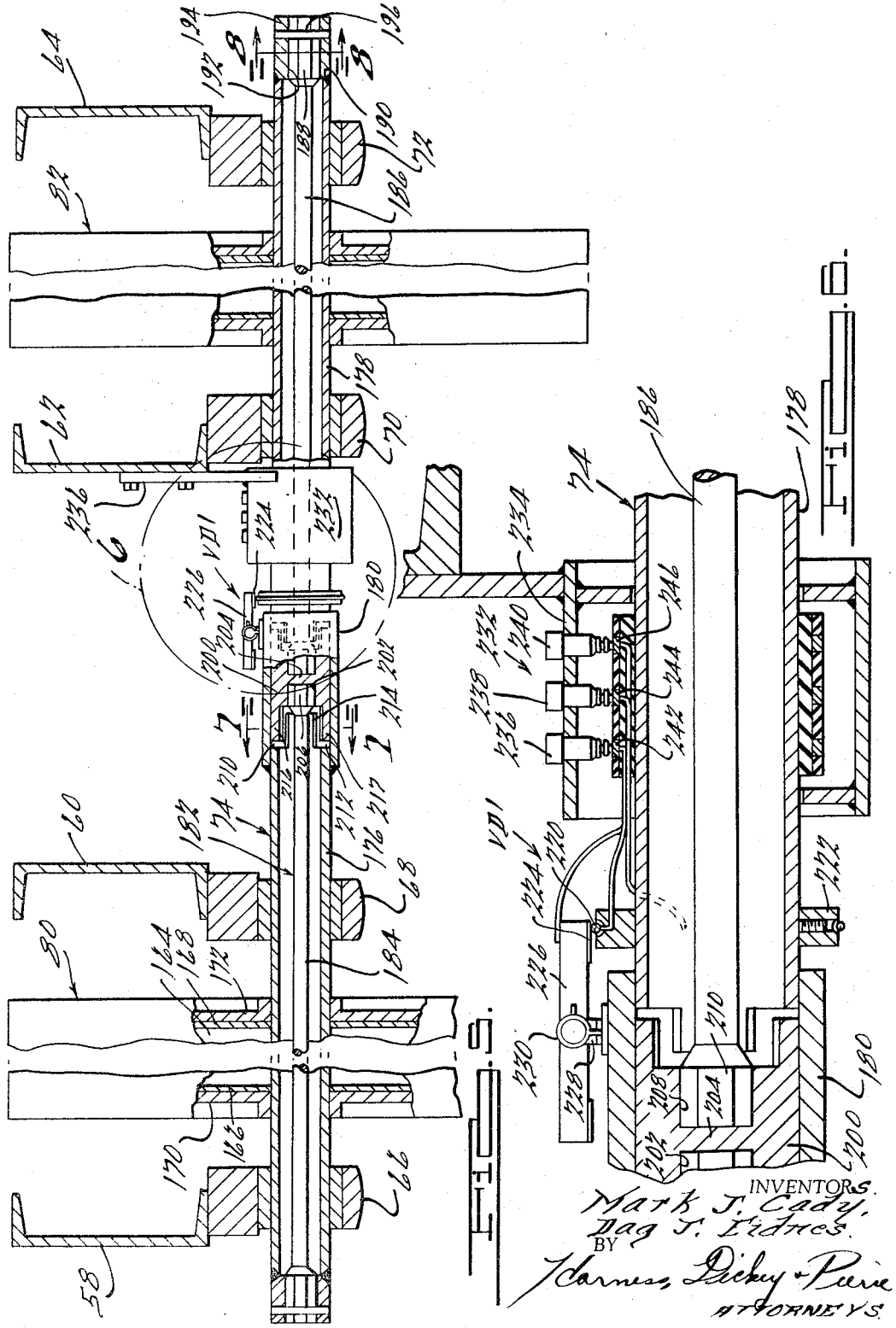

3,305,935
VEHICLE TEST SYSTEM
Mark J. Cady, Detroit, and Dag J. Eidnes, Livonia, Mich., assignors to Lynch Corporation, Detroit, Mich., a corporation of Indiana
Filed Sept. 29, 1964, Ser. No. 400,020
20 Claims. (Cl. 33—203.13)

This invention relates to vehicle testing apparatus.

An object of the invention is to improve the dynamic measurement of selected characteristics of a vehicle.

Another object of the invention is to improve means for communicating driving torque, delivered by the rear wheels of a vehicle to a pair of rolls supporting those wheels, to the front wheels of the vehicle through a pair of rolls supporting those front wheels.

Another object of this invention is to selectively restrain the longitudinal movement of a vehicle having four wheels supported by individual rolls.

Another object of this invention is to measure the relationship between the braking forces developed between corresponding wheels of a vehicle under dynamic conditions.

Another object of this invention is to derive an electrical analogue of the difference between the braking torque exerted by two wheels of a vehicle.

Another object of this invention is to limit the maximum torque applied to a spring which measures the difference between the braking torques exerted by two wheels of a vehicle.

A further object of this invention is to improve the dynamic measurement of the toe-in of the front wheels of a vehicle.

Another object of this invention is to improve the methods of measuring toe-in of a vehicle.

A further object of this invention is to adapt a toe-in measuring apparatus for use with vehicles of varying sizes.

Another object of this invention is to adapt a toe-in measuring apparatus to accommodate variations in the position of the vehicle and variations of the steering angle of the vehicle.

The manner of accomplishing the foregoing objects, and other objects and features of the invention, will be perceived from the following description of an embodiment of the invention when read with reference to the accompanying drawings in which:

FIGURE 1 is a top plan view of an apparatus embodying certain of the principles of the present invention;

FIG. 2 is a front elevational view of the apparatus of FIG. 1 taken in the direction of the arrow 2 in FIG. 1;

FIG. 3 is a fragmentary partially cut-away sectional view taken substantially along the line 3—3 of FIG. 1;

FIG. 4 is a fragmentary sectional view taken substantially along the line 4—4 of FIG. 3;

FIG. 5 is a transverse sectional view taken substantially long the line 5—5 of FIG. 3;

FIG. 6 is an enlarged sectional view taken in the area of the circle marked 6 in FIG. 5;

FIG. 7 is a sectional view taken substantially along the line 7—7 of FIG. 5;

FIG. 8 is a sectional view taken substantially along the line 8—8 of FIG. 5;

FIG. 9 is a schematic illustration of an electrical circuit for use in association with the apparatus of FIGS. 1 through 8;

FIG. 10 is a schematic representation of another electrical circuit for use in association with the apparatus of FIGS. 1 through 8; and FIG. 11 is a schematic representation of a pneumatic circuit for use in association with the apparatus of FIGS. 1 through 8.

The illustrated apparatus includes a support frame 10 (FIG. 1) including side members 12 and 14, cross members 16, 18 and 20, and longitudinal members 21, 22, 23 and 24 interjoining cross members 16 and 18, all suitably interconnected. Cross members 18 and 20 constitute elements of a rear cradle assembly and support longitudinal members 26, 28, 30 and 32 extending therebetween. In a manner to be more fully described with reference to the front cradle assembly, cross members 26, 28, 30 and 32 bearingly support a shaft assembly 34 for rotation about its longitudinal axis. A right rear main roll 36 and a left rear main roll 38 are supported and keyed to shaft assembly 34 for rotation therewith.

A front cradle assembly 40 is supported for limited longitudinal movement on and with respect to the support frame 10 by means of wheels 42, 44, 46 and 48 engaging, in pairs, tracks 50 and 52 supported by longitudinal members 21 and 24, respectively. Front cradle assembly 40 comprises a carriage including cross member assemblies 54 and 56 and longitudinal members 58, 60, 62 and 64. As may best be seen in FIG. 5, longitudinal members 58–64 individually support bearings 66, 68, 70 and 72 which support a transverse shaft assembly 74 for rotation about its longitudinal axis. A right front main roll 80 is welded, keyed or otherwise secured to shaft assembly 74, intermediate bearings 66 and 68, and a left front main roll assembly 82 is similarly secured to shaft assembly 74 at a location between bearings 70 and 72.

It is contemplated that the rear cradle assembly be covered with a floor plate except for apertures through which the tops of rolls 36 and 38 slightly project and that the front carriage 40 similarly carry a floor plate through which the tops of rolls 80 and 82 project, with the floor plates overlapping to accommodate longitudinal movement of carriage 40. It is further contemplated that appropriate access ramps be placed at the ends of the support structure 10 so that an automobile may be driven upon the illustrated apparatus with its rear wheels resting upon rolls 36 and 38 and with front carriage assembly 40 being adjusted longitudinally so that the front wheels of the particular automobile rest upon rolls 80 and 82. Carriage 40, once adjusted for the particular vehicle, is or may be locked in that position in any suitable manner.

In the preferred utilization of the disclosed apparatus, certain characteristics of the vehicle are tested dynamically, that is with the vehicle operating as if it were traveling along a road at a selected speed. To this end, the rear rolls 36 and 38 are interconnected (in a manner to be described hereinafter) by shaft assembly 34 so that those two rolls will be rotated at substantially the same speed in response to rotation of the rear wheels of the vehicle by the engine and power transmission train of the vehicle. While, as will be seen, shaft assembly 34 permits limited relative rotation between rolls 36 and 38 (substantially less than one revolution in the preferred arrangement) for a purpose to be noted, during acceleration and running of the vehicle, rolls 36 and 38 may be considered to be locked together. In order to drive the front wheels of the vehicle so as to permit dynamic testing of certain of their characteristics, a torque transmitting coupling is established between the rear rolls 36 and 38, or one of them, and the front rolls 80 and 82, or one of them. In the illustrated and preferred arrangement, this means comprises a rear driven member 86 (FIG. 1), frictionally engaging the surface of and driven by roll 38, a front driving member 88 in frictional engagement with the surface of and driving front roll 80, and means for transmitting torque between the members 86 and 88.

Driving member 88 is in the form of a roll having a peripheral surface which is frictionally engageable with main roll 80 so as to be selectively capable of transmitting torque thereto. In a preferred arrangement, driving member 88 is formed of a wheel from a vehicle with a vehicular tire thereon. In a construction embodiment, the tire was a 6.00–13 automobile tire.

As may best be seen in FIGS. 2 and 4 of the drawings, wheel 88 is rotatably mounted on an axle or spindle assembly 92 (FIG. 2) which is in turn rotatably supported by a pivot arm 94. Pivot arm 94 is pivotally supported by a pivot pin 96 which is suitably supported upon or in fixed relation to support member 54. The upper end of pivot arm 94 engages a device 98 which acts against longitudinal member 54 and is capable of exerting a force upon pivot arm 94 tending to pivot that arm in a counterclockwise sense (in the view of FIG. 3) about pivot point 96 so as to rotate the axis of wheel 88 about point 96 towards and into frictional driving engagement with the surface of roll 80. In a constructed embodiment of the invention, device 98 was a pneumatic bellows together with means for selectively applying pneumatic pressure within that bellows to cause it to expand and exert a force upon pivot arm 94. The center of gravity of the assembly including wheel 88 is selected to cause the wheel to tend to rotate to a position spaced from roll 80 when pneumatic pressure within device 98 is relieved.

The driven wheel 86 (FIG. 1) is preferably similarly supported for selective frictional engagement with the surface of roll 38 and a similar means, such as bellows 100, may be employed to establish the desired selective frictional engagement.

While any suitable means may be employed for transmitting torque from the driven member 86 to the driving member 88, in the illustrated and preferred arrangement, a hydraulic pump 102 (FIG. 1) is connected to and is driven by wheel or driven member 86. Pump 102 develops a hydraulic pressure which varies as a function of the speed of rotation of driven member 86, and which is communicated via a line 104 to a hydraulic motor 106 (FIGS. 1 and 2) connected to and driving the driving member 88. If it is necessary or advantageous to establish some preselected speed relationship between the rear rolls 36–38 and the front rolls 80, 82 for a given test of the vehicle, the speed relationship may be adjusted, in one manner, by varying the relative sizes of the members 86 and 88. For example, if it is desired to have the front rolls 80, 82 move at the same speed as the rear rolls 36–38, and if the hydraulic torque transmission system is subject to slippage or otherwise fails to maintain the desired synchronism, the front driving member 88 may be made appropriately larger in circumference than the rear driven member 86 to compensate for that slippage.

To stabilize the vehicle laterally and to insure that the tires of the vehicle will not move laterally from the individual main rolls, two lateral guide rolls 110 and 112 are mounted, one to each side of roll 80, for rotation about vertical axes which are fixed with respect to the support frame 10 in any suitable manner. These rollers project above the surface of the roll 80 and are positioned to engage the outer or inner periphery of the tire of the vehicle if the vehicle moves laterally of the roll. Similar lateral guide rolls may be provided for each of the other rolls 82, 36 and 38.

Means are also provided for selectively preventing the car from moving off of the main rolls 36, 38, 80 and 82 in a longitudinal sense, either forward or reverse. In the preferred arrangement, forward movement of the vehicle is selectively prevented by forward retaining rollers 114 and 116 disposed adjacent main rolls 80 and 82, respectively, and rearward movement of the vehicle is selectively prevented by a pair of rear retaining rollers 118 and 120 positionable adjacent the surfaces of main rolls 36 and 38, respectively. In each case, it is preferred that means be provided for selectively elevating these retaining rollers from a position in which they do not interfere with the movement of the vehicle to or from the test apparatus, to a position in which they perform their retaining function. This mechanism may be similar for each of the retaining rollers and that for retaining roller 114 as illustrated in FIGS. 1, 2 and 3.

Forward retaining roller 114 is rotatably supported, at its two ends, by arms 124 and 126, the remote ends of which are pivotally supported by the carriage 40. Arm 126, for example, is connected to a bearing 128 (FIGS. 1 and 3) which is rotatably mounted upon the longitudinal member 60. In the illustrated arrangement, the two arms 124 and 126 are interconnected by means of a tie-bar 130 which may be provided with means such as one or more projecting lugs 132 adapted to engage a pivotal section of the floor plate (not shown) to lift that floor plate section as the retaining roller 114 is elevated into operative position.

One end of a link 134 is pivotally connected to arm 126 at a point intermediate its ends and the other end of that link is pivotally connected to and clasped between the arms of a clevis 136. The base portion 138 of clevis 136 is welded or otherwise secured to a cross shaft or tube 140 which extends across the width of the carriage 40 and is rotatably supported with respect thereto in any suitable manner. Corresponding clevis assemblies 142 (FIG. 1), 144 and 146 are secured to tube 140 as elements of the mechanisms for controlling the position of retaining rollers 114 and 116.

Selectively actuable means are provided for rotating tube 140 to control the position of the retaining rollers 114 and 116. In the illustrated arrangement, this means comprises a hydraulic or pneumatic cylinder 150 (shown in FIG. 1 and in FIG. 3) one end of which is pivotally connected to a link 152 and the other end of which is rigidly secured to the carriage 40. The piston 154 of the cylinder 150 is pivotally connected to an arm 156 which is welded or otherwise secured to the tube or shaft 140.

In the drawings, the front retaining roller 114 is shown in its elevated position above the level of the roll 80 and in a position to engage a portion of the forwardly disposed surface of the right front tire 158 (FIGS. 2 and 3) of the vehicle. When the piston rod 154 of the cylinder 150 is selectively extended, arm 156 is rotated to rotate tube or shaft 140 about its longitudinal axis in a clockwise sense (FIG. 3) so as to rotate the clevis 136 in a similar sense. This rotation of the toggle and of the pivot pin carried thereby rotates and translates link 134 so as to rotate arm 126 about bearing 128 in a counterclockwise sense (FIG. 3) to move retaining roller 114 below the level of the upper surface of roll 80. It will be observed that the elevated position of retaining roller 114 is established by the engagement between clevis 136 (or portion 138 thereof) and an adjustable stop screw 160 which threadedly engages a nut 162 which is fixed with respect to carriage 40 as by being secured to longitudinal member 60. Corresponding adjustable stops are provided for the other clevises 142, 144 and 146. Stop 160 (as the other stops) is adjusted such that it blocks further rotational motion of the shaft 140 in a counterclockwise sense (FIG. 3) only after the line defined by the two pivotal axes of link 134 has passed beyond the rotational axis of shaft 140. As a result, there is a locked-knee effect wherein the application of forces to retaining roll 114 in a forward direction and in a sense to tend to rotate arm 126 in a counterclockwise sense about bearing 128 results in the application of forces through clevis 136 tending further to rotate shaft or tube 140 in a counterclockwise sense and hence to force clevis 146 into engagement with stop 160, as a safety measure.

Similar mechanisms may be employed to control the selective elevation of the rear retaining rollers 118 and 120. As illustrated, in the preferred arrangement, the retaining rollers for preventing forward motion of the vehicle are preferably located in front of the front wheels of the vehicle whereas the retaining rollers for preventing rearward movement of the vehicle are preferably located rearwardly of the rear wheels of the vehicle. This has proved to be advantageous in practice since it permits a greater raised effective height of the retaining rollers, with increased safety, without striking elements depending from the undercarriage of the vehicle.

The illustrated apparatus is adapted to perform a dynamic braking test, that is, a braking test which is performed while the vehicle is, in effect, moving at a selected road speed. In the performance of this test, the vehicle is positioned with its wheels in engagement with the respective main rolls, the engine is started, the vehicle is placed in gear, and the rear wheels are rotated at a selected road-equivalent speed, to rotate drums 36 and 38. As above noted, the mechanism including driven and driving members 86 and 88 communicates the rotational motion of the rear main rolls 36 and 38 to the front main rolls 80 and 82 to produce rotation of those rolls in the same sense, to simulate movement of the vehicle. To improve the simulation of the effects of the inertia and momentum of the vehicle, the main rolls 36, 38, 80 and 82 are preferably made to have a relatively high moment of inertia and the hydraulic intercoupling of the several rolls also increases the effect. In a constructed arrangement, the main rolls, such as roll 80 (FIG. 5), were formed as drums, having a cylindrical side wall 164 integral with end walls 166 and 168, with relatively massive circular end plates 170 and 172 secured thereto.

With the vehicle effectively running at selected speed, the brakes are applied. The inertia and angular momentum of the main roll system and wheels of the vehicle must be overcome by the brakes. The relative efficiency of the two brakes in each lateral pair of brakes is then measured. In the preferred arrangement, this measurement is accomplished by establishing a torsion-spring connection, as an element of the shaft means 34 or 74, between the two main rolls 36 and 38 and between the two main rolls 80 and 82, and the magnitude of the twisting of that torsion spring is measured to indicate and reflect the difference between the braking torque applied to the two main rolls of each pair.

In the illustrated arrangement, each of the shaft means, such as shaft means 74 (FIG. 5), comprises a pair of similar coaxial tubes 176 and 178 disposed in end-to-end alignment. Tube 176 is supported by bearings 66 and 68 and supports main roll 80, while tube 178 is supported by bearings 70 and 72 and supports main roll 82. The inner ends of tubes 176 and 178 project partially within the ends of a sleeve 180. Sleeve 180 is welded or otherwise secured to one of the tubes, such as tube 176, but is free to rotate relative to the other tube, such as tube 178. A torsion bar assembly 182 is disposed within and coaxially of tubes 176 and 178. This torsion bar assembly can take the form of a single bar extending the conjoint length of tubes 176 and 178 but in the preferred arrangement was formed of two torsion bar sections 184 and 186. The right hand (FIG. 5) end of torsion bar section 186 is rigidly secured in any suitable fashion to the outboard end of tube 178 and the left hand end of torsion bar section 184 is similarly rigidly secured to the outboard end of tube 176. In the illustrated arrangement, this is accomplished by providing the end portion 188 of the torsion bar section 186 with other than a circular cross section (such as octagonal, FIG. 8) and projecting it beyond the end 190 of tube 178. This projecting portion 188 engages a correspondingly shaped socket 192 an end cap or coupling 194 which is welded or otherwise secured to the end of tube 178. A transverse pin 196 extends through coupling 194 in a position to abut the end of torsion bar section 186 so as to establish the axial position of that end. The outboard end of torsion bar section 184 is or may be secured to the outboard end of tube 176 in a similar fashion.

Within the sleeve 180, the adjacent ends of torsion bar sections 184 and 186 are rigidly interconnected by means of a coupling 200. Coupling 200 is provided with a noncircular, such as octagonal, socket 202 at one end, terminating at a web 204 (FIGS. 5 and 6), to accept the correspondingly shaped end portion 206 of torsion bar section 184. Correspondingly, at the other end, coupling 200 is provided with a noncircular socket 208, also terminating at web 204, accepting the correspondingly shaped end portion 210 of the torsion bar section 186. This rigid interconnection of the adjacent ends of the torsion bar sections 184 and 186 causes the torsion bar assembly to act effectively as a unit.

In the performance of the braking test, the wheels of the vehicle and main rolls 80 and 82 are rotated at a selected substantial velocity through the above-described power train including the engine of the vehicle, the application of power is terminated, and the brakes are applied. If the two wheels are not equally braked so that the effective braking torque applied to the main rolls 80 and 82 is not equal, different torques will be applied to tubes 176 and 178 by main rolls 80 and 82, respectively, and a torsional force will be applied tending to twist the torsion bar sections or elements 184 and 186 (acting as a unit) over their length. The extent of the twisting of the torsion bar assembly will be reflected in a relative rotational motion between the tubes 176 and 178 and the extent of that relative angular movement will indicate and reflect the difference between the braking torques of the two vehicular wheels which are engaging main rolls 80 and 82.

In the illustrated arrangement, the degree of the relative angular movement between tubes 176 and 178 is measured electromechanically although other systems can be employed. Thus, an electrical analogue of the rotational positional relationship between the sleeve 180 (integral with tube 176) and tube 178 is derived by means including an annular resistance element 220 (FIGS. 5 and 6) supported in a fixed or adjustably fixed position upon tube 178 by ring 222, from which it is electrically insulated, and an arm 226 carrying a brush or contact 224 electrically engageable with resistance 220 and fixed or adjustably fixed to sleeve 180 so that it rotates therewith. Arm 226 is pivotally supported by a bracket 228 at its effective center of mass so that it is dynamically balanced. Bracket 228 is secured to sleeve 180. A torsion spring 230, acting between bracket 228 and arm 226, biases arm 226 in a clockwise sense (FIG. 6) to hold contact 224 in bearing relationship with resistance element 220.

Resistance element 220 and contact element 224 constitute elements of a variable voltage divider assembly VD1, the electrical connections being taken off by means of a slip-ring assembly 232. Assembly 232 comprises a sleeve 234 which is secured in fixed or adjustably fixed relation to the carriage 40, as by being supported by a bracket 236 (FIG. 5) which is secured to longitudinal member 62. Sleeve 234 (FIG. 6) carries three insulated brushes 236, 238 and 240 engageable with individual conductive rings 242, 244 and 246 which are insulatedly supported upon tube 178. The two ends of the resistance element 220 are connected to two of the rings 242–246, and the brush or contact 224 is connected to the other one of those rings. Relative rotation between tube 178 and sleeve 180 will produce corresponding relative angular movement between contact 224 and resistance element 220 so that the amount of resistance between contact 224 and the opposite ends of resistance element 220 will be varied in accordance with the magnitude of the relative angular rotation of those two parts.

The variable voltage divider assembly VD1 may be incorporated in suitable circuitry to provide an indication of the physical relationship between the contact 224 and the resistive element 220. A type of Wheatstone bridge circuit is illustrated in FIG. 9 of the drawings.

In that circuit, the two ends of the resistance element 220 of variable voltage divider VD1 (corresponding, for example, to brushes 236 and 238 in FIG. 6) are connected, respectively, to equal resistors R1 and R2, with the other terminals of those resistors being connected, respectively, to the two terminals of a source of direct potential B1. The movable element or contact 224 (connected, for example, to brush 240) is connected to one terminal of a meter M1, the other terminal of which is connected through a variable resistor VR1 and a fixed resistor R5 to the movable contact or brush of a potentiometer or variable voltage divider VD2. The two ends of the resistive element of variable voltage divider VD2 are connected to individual equal resistors R3 and R4, the other terminals of which are connected, respectively, to the two terminals of the source of potential B1. Voltage divider VD2 is manually adjustable to balance the variable voltage divider VD1, and variable resistor VR1 is provided to calibrate meter M1. With the elements properly adjusted, equal braking torques exerted by the two wheels will produce no relative rotation of contact 224 relative to resistance element 220 so that, with the circuit properly initially balanced, there will be no current flow between the movable element 224 of variable voltage divider VD1 and the movable element of variable voltage divider VD2 so that there will be no deflection of meter M1. However, if there is a difference in the braking torques exerted by the two wheels of the vehicle, there will be such relative rotation, contact 224 will be shifted in position along resistance 220, the potential existing at contact 224 will differ from that appearing at the brush of variable voltage divider VD2, and current will flow through meter M1. The magnitude of that current will reflect the magnitude of the relative rotation between tubes 176 and 178 and hence the magnitude of the disparity between the braking torques applied by the two vehicle wheels. By employing a zero-center meter M1, the direction of deflection of the meter will indicate which of the two wheels of the vehicles is exerting the greater braking torque.

Similar measuring equipment and similar circuitry may be associated with the two rear main rolls 36 and 38 (FIG. 1).

The torsion bar assembly should desirably be selected to have an adequate angular-deflection versus torque characteristic to give the desired sensitivity of measurement, so that relatively small differences in the braking characteristics of the vehicular wheels can be detected and accurately indicated. However, the achieving of a satisfactory degree of sensitivity imposes the risk that the torsion bar assembly will be over stressed if subjected to high torque differentials resulting, for example, from a gross disparity between the braking capabilities of the two wheels of the vehicle. In the illustrated arrangement, torque-limit means are provided for preventing the application of a torque to the torsion bar assembly in excess of that which that assembly can safely accommodate. To that end, the centermost end of tube 176 is provided with, representatively, two longitudinal notches 210 and 212 (FIGS. 5 and 7) extending a short distance along its length in an outboard direction and defining two centrally projecting arcuate finger portions 214 and 215. Correspondingly, the left hand end of coupling 200 is provided with a pair of longitudinal notches defining a pair of projecting finger portions 216 and 217 extending into notches 210 and 212, respectively. The width of the finger portions in each of the two elements is substantially less than the width of the notch which it engages. A corresponding arrangement is provided at the junction between tube 178 and coupling 200, with any suitable means being provided to maintain the longitudinal relationship of those parts.

The parts are initially oriented approximately as illustrated in FIG. 7 of the drawings in which the fingers 216 and 217 are circumferentially spaced from the fingers 214 and 215. As a differential torque is applied to tubes 176 and 178 through the main rolls 80 and 82, due to differential braking, the torsion bar assembly including sections 184 and 186 is twisted and the angular relationship between tubes 176 and 178 is correspondingly shifted. If the differential torque which is applied becomes excessive, the angular relationship of tubes 176 and 178 shifts sufficiently so that the finger portions on each engage the associated finger portions on coupling 200 so that tubes 176 and 178 effectively become locked together with respect to the torque of the applied sense. This effective interlocking of tubes 176 and 178 precludes any significant additional twisting of torsion bar sections 184 and 186 in that direction.

It will be recognized that the brake-test equipment as described will only detect disparities between the braking torques exerted by the two front wheels in relation to one another or by the two rear wheels in relation to one another, and will not measure the sharing of the braking load between the front and rear wheels of the vehicle. If it is desired to measure this characteristic of the vehicle, it is contemplated that conventional tachometer generators be associated with the shaft means 34 and 74 so as to be rotated at a velocity determined by the rotation of those shaft means. Each of those tachometer generators is then incorporated in a suitable circuit, such as that illustrated in FIG. 10 of the drawings. In that circuit, the tachometer generator TG (associated with shaft means 34 or 74) is connected across a capacitor C1 and a resistor R6 (which may be variable for adjustment) in series with one another. A peak reading ammeter M2 is connected in parallel with resistor R6. In operation, the vehicle is brought up to a selected speed on the test apparatus so that tachometer generator TG is rotating at a preselected velocity, and, accordingly, generating a preselected voltage. After an initial charging period, C1 is charged essentially to that voltage and will remain so charged as long as the speed of the vehicle is maintained.

As in the previously described braking test, the application of power to the rear wheels is terminated and the brakes are applied. The output voltage of the tachometer generator TG will decrease at a rate determined by the rate of deceleration of the wheels of the vehicle with which that tachometer generator is associated, and capacitor C1 will correspondingly discharge at a rate determined by the rate of reduction of the voltage produced by generator TG to produce a discharge current through the ammeter M2. That meter will measure the peak rate of that current flow to produce an indication of the rate of deceleration of the associated wheels of the vehicle. The meter associated with each of the pairs of wheels of the vehicle will provide, individually, an indication of the braking capability of those wheels of the vehicle and the two meters, conjointly, will give an indication of the degree to which the braking load is shared by the front and rear wheels. While it has been found to be satisfactory to compare the readings of meter M2 and of the corresponding meter associated with the other pair of the vehicular wheels by eye, if desired, electrical circuit means may be provided for making that comparison.

The illustrated apparatus is also capable of measuring toe-in on a dynamic basis, that is, while the front wheels of the vehicle are rotating. While certain of the principles embodied in the disclosed measuring apparatus, and in its method of use, are equally applicable to the measurement of selected characteristics of the vehicle, including toe-in, under static or stationary conditions, it has been found that dynamic measurement of toe-in is advantageous in that it reflects and indicates any change in the toe-in which occurs as a result of the transition from static to dynamic operation. Thus, with the steering geometry employed in conventional automobiles, a force is developed upon the front wheels and tires as the vehicle travels down the road tending to rotate the forward portions of the tires outwardly and thence rearwardly. While this rotation is opposed by the tie rod or equivalent elements, the force is normally effective to establish a significant difference between the magnitude of the toe-in when the vehicle is stationary and the magnitude of the toe-in when the vehicle is moving.

In general, the magnitude of the toe-in is measured by locating the vertical plane defined by a face surface (or by two points on or related to that face) for one wheel or tire, locating the corresponding vertical plane for the other wheel, and measuring the angle between those two planes. In the preferred arrangement, the angle is measured between a first generally horizontal line established by two points on a side surface (representatively the outer side surface) of a tire and a corresponding generally horizontal line defined by two points on a side surface of the other tire. The angle between those lines is measured either directly or by relating each to a reference line or plane. In the preferred arrangement, the two points are located on opposite sides of a vertical plane containing the rotational axis of the front wheels, and are preferably substantially equally spaced from that plane. Ideally, these points are diametrically related, that is, the horizontal line is also intersected by the rotational axis of the wheel, but this is not imperative. It will be appreciated that when the measurements are made under dynamic conditions, each of the two "points" are actually a succession of points lying in a circle. The line should be generally horizontal (or the located plane should be generally vertical) in order to discriminate against the effects of other factors in the steering geometry. Desirably, the measurements of the two tires should be conducted simultaneously to eliminate the effect of any steering of the vehicle during the dynamic test. In the preferred arrangement, the points on the surface of the tire which are employed to determine the location or attitude of the vertical plane of the surface (or the location of a horizontal line including those points) are at the point of maximum diameter of the tire.

In the illustrated arrangement, the toe-in measuring apparatus includes an assembly 250 (FIG. 1) cooperable with the right front wheel of a vehicle and an assembly 252 cooperable with the left front wheel of the vehicle. Assemblies 250 and 252 are supported by the carriage 40 and, in the preferred arrangement, are pivotable between an outboard position (illustrated in solid lines in FIG. 2 of the drawings) in which they do not interfere with movement of the vehicle onto the test apparatus, and an inboard position (indicated in phantom in FIG. 2) in which they are in cooperative relationship with the tires of the vehicle. Assembly 250, which is representative of the two assemblies, comprises a pair of spaced-apart toe-in bearing rolls or wheels 254 and 256 (FIGS. 2, 3 and 4) which are rotatably supported upon individual ones of a pair of brackets 258 and 260, those brackets being bolted or otherwise secured to a pivot bar 262. Desirably, brackets 258 and 260 are positioned to maintain the rotational axes of rolls 254 and 256 aligned. If desired, one or both of the brackets 258 and 260 may be slotted or otherwise conformed to permit shifting of its longitudinal position along pivot bar 262 so as to shift the distance between the peripheral center lines of rolls 254 and 256 to adjust them for varying tire sizes.

Pivot bar 262 is supported for rotation about vertical pivot pin 264 by a reference bar assembly 266. Assembly 266 is supported by a pair of arms 268 and 270 (FIGS. 2 and 3) which are spaced apart to straddle the main roll 80. The lower ends of those arms are rigidly secured to a shaft 272 which is rotatably supported by brackets 274 and 276 which are fixed with respect to the carriage 40 in any suitable fashion. An arm 278 is rigidly connected to shaft 272 near its mid portion and depends therefrom to support a cross shaft 280 carrying, to either side of arm 278, weights 282 and 285. A hydraulic ram 284 as a representative force producing means, has one end pivotally connected to the lower end of arm 278 and has its other end pivotally connected to the corresponding arm 286 of assembly 252. Arm 278 is disposed at an angle to arms 268 and 270 (as viewed in FIG. 2), and the parts are proportioned so that the assemblies are gravity biased to their outboard positions as illustrated in solid lines in FIG. 2 in the drawing.

When hydraulic pressure is applied to ram 284, assemblies 250 and 252 are pivoted towards their phantom-line position to bring the toe-in bearing wheels, such as wheel 254, into engagement with the face surfaces, representatively the outer face surfaces, of the tires of the vehicle. If the vehicle is not precisely centered upon the main rolls 80 and 82, the toe-in adjusting equipment will automatically adjust to proper relationship with the vehicle tire, since ram 284 operates between the two assemblies 250 and 252 and will force those assemblies into whatever pivoted relationships are required to develop effectively equal forces between the toe-in bearing wheels and the outer surfaces of the tires.

If desired, means may be provided for adjusting the vertical position of the pivotal axes including axis 272 to bring the rotational axes of the bearing wheels, including wheel 254, into alignment with the rotational axis of the wheels of the vehicle. However, it has been found that precise alignment with the rotational axis of the vehicular wheels is not essential and that completely satisfactory results can be obtained with current automobiles, particularly if the distance between the rotational center of the bearing wheel, such as wheel 254, and the pivotal axis of the assembly such as shaft 272, is made relatively long as illustrated. While the bearing wheels will tilt inwardly to a greater degree with a smaller car than with a larger, the smaller car also customarily has a smaller wheel diameter so that the effective lowering of the bearing wheels as a result of their additional tilting normally tends to bring those bearing wheels to their proper height for the particular vehicle being tested.

With the toe-in bearing wheels 254 and 256 (FIGS. 3 and 4) engaging the outer face surface of the vehicular tire and, preferably, engaging the circular line thereon representing the point of greatest transverse diameter of the tire, the surfaces of those two wheels, and hence the rotational axes of these two wheels, and hence pivot bar 262, reflect and indicate the position of a vertical plane taken through the points of engagement between the bearing wheels and the tire (or the generally horizontal line between those points). By comparing the angle between pivot bar 262 of assembly 250 and the corresponding pivot bar of assembly 252, the toe-in of the vehicle may be determined. This is accomplished in the illustrated arrangement by sensing or measuring the angle between pivot bar 262 and reference bar assembly 266, by sensing or measuring the corresponding angular relationship between the pivot bar and reference bar in assembly 252, and by, in effect, comparing those angles. In the preferred arrangement, the two reference bar assemblies including assembly 266 are made parallel to one another (or the measuring equipment is calibrated to simulate that condition) and the two measured angles are then employed to obtain an absolute measure of the toe-in of the vehicle, calibratable in any suitable units.

In the illustrated equipment the angle between pivot bar 262 and reference bar 266 is, in effect, sensed or measured by means of a commercially available pneumatic gauging mechanism 290 which is supported in or on reference bar 266 and which carries a projecting valve 292 adapted to abut a reference surface 294 on pivot bar 262. Air gauge 290 is connected to a suitable source of pneumatic pressure and the rate of flow of air to the atmosphere through the valve assembly 292 is modulated in accordance with the position of valve 292 and hence in accordance with the angular relationship between pivot bar 262 and reference bar 266. A similar gauge is employed for the other assembly 252. A representative pneumatic circuit for comparing the two measured angles and for deriving an indication of the relationship therebetween is illustrated in FIG. 11 of the drawings. Air from a source 300 of regulated air pressure is supplied through an adjustable restriction 302 to atmosphere via air gauge 290 as well as, in parallel therewith, to atmosphere via air gauge 304, associated with assembly 252, and via adjustable restriction 306. The air pressure to the right (FIG. 11) of adjustable restriction 302 is then measured by an air pressure meter 308. Restriction 302 may be adjusted to set the zero point of meter 308 (which is desirably at the center of the indicating indicia) and restriction 306 may be adjusted to control the span of the measurement. It will be perceived that changes of the position of the two wheels of the vehicle, acting together, as a result of minor steering movements, will not affect the reading of meter 308 since the resultant change in air flow through gauge 290 (and the resultant change in pressure drop across orifice 302) will be balanced by the opposite change in air flow through the other air gauge, since the angular relationship between the two pivot bars and their respective reference bar assemblies are changing equally and oppositely. However, with changes in the toe-in of the vehicle, there is a corresponding change in the effective angle between the two pivot bars which is reflected in a change in the pressure drop across orifice 302 and a corresponding change in the reading of meter 308. Accordingly, meter 308 may be calibrated in terms of toe-in, or units reflecting toe-in, and will accurately indicate the magnitude of the toe-in, the parallelism, or the magnitude of the toe-out of the vehicle, and these measurements may be performed while the vehicle is, in effect, traveling, that is, they may be performed dynamically.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a test apparatus for a vehicle having front and rear pairs of wheels one of which is driven, the combination of a support frame, a front roll assembly comprising two front rolls rotatably supported by said frame and each engageable with and adapted to support an individual one of the front wheels of the vehicle, a rear roll assembly comprising two rear rolls supported by said frame and each engageable with and adapted to support an individual one of the rear wheels of the vehicle and torque-transmitting means interconnecting said rear rolls, and means connected to and driven by one of said assemblies for driving the other one of said assemblies, said torque-transmitting means comprising a torsion spring connection between said rear rolls.

2. In a test apparatus for a vehicle having front and rear pairs of wheels one of which is driven, the combination of a support frame, a front roll assembly comprising two front rolls rotatably supported by said frame and each engageable with and adapted to support an individual one of the front wheels of the vehicle and torque-transmitting means interconnecting said front rolls, a rear roll assembly comprising two rear rolls supported by said frame and each engageable with and adapted to support an individual one of the rear wheels of the vehicle and torque-transmitting means interconnecting said rear rolls, and means connected to and driven by one of said assemblies for driving the other one of said assemblies, said torque-transmitting means interconnecting said front rolls comprising a torsion spring connection between said front rolls, said torque-transmitting means interconnecting said rear rolls comprising a torsion spring connection between said rear rolls.

3. In a test apparatus for a vehicle having front and rear pairs of wheels one of which is driven, the combination of a support frame, a front roll assembly comprising two front rolls rotatably supported by said frame and each engageable with and adapted to support an individual one of the front wheels of the vehicle and torque-transmitting means interconnecting said front rolls, a rear roll assembly comprising two rear rolls supported by said frame and each engageable with and adapted to support an individual one of the rear wheels of the vehicle and torque-transmitting means interconnecting said rear rolls, and means connected to and driven by said rear roll assembly for driving said front rolls, said torque-transmitting means interconnecting said front rolls comprising a torsion spring connection between said front rolls, said torque-transmitting means interconnecting said rear rolls comprising a torsion spring connection between said rear rolls, each of said torsion spring connections comprising coaxial shafts connected to the respective ones of each pair of rolls and means for locking the adjacent ends of said coaxial shafts against rotation relative to one another.

4. In a test apparatus for a vehicle having front and rear pairs of wheels one of which is driven, a support frame, a front roll assembly comprising two rolls supported by the frame and each engageable with and adapted to support an individual one of the front wheels of the vehicle, and a rear roll assembly comprising two rear rolls supported by the frame and each engageable with and adapted to support an individual one of the rear wheels of the vehicle, the combination of a first rotatable circular frictional driving member, rotatable about an axis spaced from the axis of and engageable with the surface of one of the rolls of one of the assemblies and frictionally drivable thereby, a second circular rotatable frictional driving member rotatable about an axis spaced from the axis of said first circular rotatable frictional driving member and spaced from the axis of and engageable with the surface of one of the rolls of the other one of the assemblies and effective when rotated to frictionally drive the associated roll, and driving means including said first rotatable frictional driving member for driving said second rotatable frictional driving member.

5. The combination of claim 4 in which said driving means further includes a hydraulic pump connected to and driven by said first rotatable frictional driving member, and a hydraulic motor connected to and adapted to rotate said second frictional driving member and connected to and driven by said hydraulic pump.

6. The combination of claim 4 in which each of said frictional driving members is a wheel with a tire thereon engageable with the surface of the individual roll.

7. The combination of claim 4 further including, for each of said frictional driving members, a spindle for mounting said frictional driving member about a first axis, an arm pivotally supporting said spindle means for rotation about a second axis generally parallel with but spaced from said first axis, and force-exerting means engageable with said arm for pivoting said arm about said second axis for changing the frictional driving relationship between said rotatable frictional member and the associated one of said rolls.

8. The combination of claim 7 in which said frictional driving member is gravity-biased away from frictional engagement with the associated one of said rolls and in which said force-exerting means opposes and overcomes said gravity bias.

9. The combination of claim 4 further including torque-transmitting means interconnecting the front rolls, and torque-transmitting means interconnecting the rear rolls.

10. In a test apparatus for a vehicle having front and rear pairs of wheels one of which is driven, a support frame having access ramps at the ends thereof, a front roll assembly comprising two rolls supported by the frame and each engageable with and adapted to support an individual one of the front wheels of the vehicle, and a rear roll assembly comprising two rolls supported by the frame frame and each engageable with and adapted to support an individual one of the rear wheels of the vehicle, the combination of a forward-movement-preventing guide roller associated with the front roll assembly and rotatable about a generally horizontal axis and pivotable from a position below the upper surface of the rolls of the associated assembly to a position above the upper surface of those rolls and forward of the axis of those rolls in which it is adapted to engage a front wheel of the vehicle forward of the rotational axis of that front wheel, a rearward-movement-preventing guide roller associated with the rear roll assembly and rotatable about a generally horizontal axis and pivotable from a position below the upper surface of the rolls of the associated assembly to a position above the upper surface of those rolls and rearward of the axis of those rolls in which it is adapted to engage a rear wheel of the vehicle rearward of the rotational axis of that rear wheel, means for pivoting said guide rollers between their two positions, and positive mechanical locking means for selectively locking said guide rollers in said positions above the upper surfaces of the rolls and responsive to forces exerted by the vehicle in a direction to tend to move said guide rollers toward said positions below the upper surfaces of the rolls to increase the force retaining said guide rollers in said positions above the upper surfaces of the rolls.

11. In a test apparatus for a vehicle having front and rear pairs of wheels one of which is driven, a support frame having access ramps at the ends thereof, a front roll assembly comprising two rolls supported by the frame and each engageable with and adapted to support an individual one of the front wheels of the vehicle, and a rear roll assembly comprising two rear rolls supported by the frame and each engageable with and adapted to support an individual one of the rear wheels of the vehicle, the combination of a pair of longitudinal movement preventing guide rollers associated with the rolls of one of the assemblies, each of said movement preventing guide rollers being rotatable about a generally horizontal axis and pivotable from a position below the upper surface of the associated roll to a position above the upper surface of the associated roll and forward of the axis of the associated roll in which it is adapted to engage a front wheel of the vehicle forward of the rotational axis of that front wheel, and means for pivoting said movement preventing guide rollers between their two positions comprising arm means pivotally supported with respect to the support frame and rotatably supporting said movement preventing guide rollers, a rotatable shaft, power means for selectively rotating said shaft, link means interconnecting said shaft and said arm means, and positive mechanical locking means including said link means for selectively locking said guide rollers in said positions above the upper surfaces of the rolls and responsive to forces exerted by the vehicle in a direction to tend to move said guide rollers toward said positions below the upper surfaces of the rolls to increase the force retaining said guide rollers in said positions above the upper surfaces of the rolls.

12. The combination of claim 11 in which said link means is reticulated, and in which said locking means further includes stop means engageable by said reticulated link means to establish a locked position of said link means when said movement preventing guide rollers are in their upper position.

13. In a test apparatus for a vehicle having front and rear pairs of wheels one of which is driven, a support frame, a front roll assembly comprising two rolls supported by the frame and each engageable with and adapted to support an individual one of the front wheels of the vehicle, and a rear roll assembly comprising two rear rolls supported by the frame and each engageable with and adapted to support an individual one of the rear wheels of the vehicle, the combination of movement preventing guide roller means associated with one of the assemblies and rotatable about a generally horizontal axis and pivotable from a position below the upper surface of the rolls of the associated assembly to a position above the upper surface of those rolls in which it is adapted to engage wheels of the vehicle to prevent longitudinal movement of the vehicle in one sense, and means for pivoting said movement preventing guide roller means between said two positions comprising arm means pivotally supported with respect to the support frame and rotatably supporting said movement preventing guide roller means, a rotatable shaft, power means for selectively rotating said shaft, link means interconnecting said shaft and said arm means and positive mechanical locking means including said link means for selectively locking said guide rollers in said position above the upper surface of the rolls and responsive to forces exerted by the vehicle in a direction to tend to move said guide rollers toward said position below the upper surface of the rolls to increase the force retaining said guide rollers in said position above the upper surface of the rolls.

14. The combination of claim 13 in which said link means is reticulated and in which said locking means further includes stop means engageable by said reticulated link means to establish a locked position of said link means when said movement preventing guide roller means is in its upper position.

15. In an apparatus for measuring the toe-in of a vehicle having steerable wheel assemblies, the combination of first sensing means effective when brought into engaging relationship with a surface of one of the wheel assemblies for sensing the angular relationship between the associated wheel assembly and a reference, second sensing means effective when brought into engaging relationship with a surface of the other one of the wheel assemblies for sensing the angular relationship between the associated wheel assembly and a reference, and actuating means for concurrently bringing said first and second sensing means into engaging relationship with the associated wheel assemblies comprising pivot arm means individual to and supporting each of said sensing means and pivotable about horizontal axes which are generally parallel with one another and with the longitudinal axis of the vehicle, and power-exerting means for pivoting said pivot arm means to bring said sensing means into engaging relationship with the respective wheel assemblies.

16. The combination of claim 15 in which said power-exerting means operates directly between said pivot arm means for bringing said sensing means into equal force engagement with the respective wheel assemblies.

17. The combination of claim 15 further including weight means on said pivot arm means for gravity-biasing said pivot arms to a position in which said sensing means are spaced from engagement with the steerable wheel assemblies.

18. An apparatus for dynamically measuring the toe-in of a vehicle having front and rear pairs of wheels one of which is driven and one of which is steerable, the combination of a support frame, a front roll assembly comprising two rolls supported by the frame and each engageable with and adapted to support an individual one of the front wheels of the vehicle, a rear roll assembly comprising two rear rolls supported by the frame and each engageable with and adapted to support an individual one of the rear wheels of the vehicle, means responsive to the driving of one of said roll assemblies by the driven pair of wheels for driving the other roll assembly and means for measuring the toe-in of the vehicle while the steerable wheels are being driven comprising first sensing means effective when brought into engaging relationship with a surface of one of the wheel assemblies for sensing the angular relationship between the associated wheel assembly and a reference, second sensing means effective when brought into engaging relationship with a surface of the other one of the wheel assemblies for sensing the angular relationship between the associated wheel assembly and a reference, and actuating means for concurrently bringing said first and second sensing means into engaging relationship with the associated wheel assemblies comprising pivot arm means individual to and supporting each of said sensing means and pivotable about horizontal axes which are generally parallel with one another and with the longitudinal axis of the vehicle, and means for pivoting said pivot arm means to bring said sensing means into engaging relationship with the respective wheel assemblies.

19. The combination of claim 18 in which each of said sensing means comprises a pair of spaced-apart rollers rotatable about generally horizontal axes and engageable with the outer side surface of the wheel to opposite sides of a vertical plane through the rotational axis of the wheel and rotatable by the wheel assembly as the wheel assembly rotates about said rotational axis.

20. The combination of claim 19 in which said means for pivoting said pivot arm means comprises a power means operating directly between said pivot arm means for bringing said sensing means into equal force engagement with the respective wheels.

References Cited by the Examiner

UNITED STATES PATENTS

| | | | |
|---|---|---|---|
| 1,987,706 | 1/1935 | Prentiss | 73—126 |
| 2,011,921 | 8/1935 | Thomas | 73—123 X |
| 2,164,853 | 7/1939 | Beckwith | 33—203.15 |
| 2,595,604 | 5/1952 | Pascoe | 33—203.15 |
| 2,598,599 | 5/1952 | Pleasance | 33—203.13 |
| 3,128,561 | 4/1964 | Payne | 33—203.2 |

FOREIGN PATENTS

| | | |
|---|---|---|
| 1,056,380 | 4/1959 | Germany. |
| 1,113,841 | 9/1961 | Germany. |
| 117,917 | 6/1958 | Russia. |

LEONARD FORMAN, *Primary Examiner.*

W. D. MARTIN, *Assistant Examiner.*